US010525663B2

(12) United States Patent
Nandi et al.

(10) Patent No.: US 10,525,663 B2
(45) Date of Patent: Jan. 7, 2020

(54) FOAM INSULATION WITH IMPROVED LOW TEMPERATURE PROPERTIES (71) Applicant: JOHNS MANVILLE, Denver, CO (US)

(72) Inventors: Malay Nandi, Littleton, CO (US); Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 15 days.

(21) Appl. No.: 15/718,728

(22) Filed: Sep. 28, 2017

(65) Prior Publication Data
US 2019/0091968 A1 Mar. 28, 2019

(51) Int. Cl.
B32B 5/18 (2006.01)
E04B 1/80 (2006.01)
E04B 1/94 (2006.01)
E04D 11/02 (2006.01)
E04B 1/76 (2006.01)
E04B 2/70 (2006.01)

(52) U.S. Cl.
CPC .......... B32B 5/18 (2013.01); E04B 1/80 (2013.01); E04B 1/806 (2013.01); E04B 1/942 (2013.01); B32B 2266/02 (2013.01); B32B 2307/304 (2013.01); B32B 2307/3065 (2013.01); B32B 2307/73 (2013.01); B32B 2419/06 (2013.01); E04B 1/762 (2013.01); E04B 2/707 (2013.01); E04D 11/02 (2013.01)

(58) Field of Classification Search
None
See application file for complete search history.

(56) References Cited

U.S. PATENT DOCUMENTS

| 9,523,195 | B2 | 12/2016 | Nandi et al. | |
|---|---|---|---|---|
| 9,528,269 | B2 | 12/2016 | Nandi et al. | |
| 2014/0051776 | A1* | 2/2014 | Chen | C08G 18/1808 521/126 |
| 2014/0115989 | A1* | 5/2014 | Sievers | E04C 2/386 52/302.1 |
| 2015/0061174 | A1* | 3/2015 | Holmstrom | B29C 44/0407 264/46.6 |

(Continued)

OTHER PUBLICATIONS

DOW, High-Performance VORASURF 504 Surfactant Boosts Foam Insulation System Efficiency, The Dow Chemical Company, Midland, Michigan.

(Continued)

Primary Examiner — Babajide A Demuren
(74) Attorney, Agent, or Firm — Robert D. Touslee (57) ABSTRACT A polyisocyanurate foam insulation product is produced from an isocyanate component, a polyol-containing component, and a blowing agent. The polyol-containing component comprises one or more polyols, a fire retardant, and one or more surfactants, and the polyisocyanurate foam insulation product has an R-value per inch of at least 5.7 when measured at 40° F. In some formulations, the polyol-containing component may include a fire retardant, a metallo-organic compound, or combinations thereof. The cell size of the foam may be less than 120 microns. The polyol-containing component may include a mixture of polyols having different functionalities.

28 Claims, 7 Drawing Sheets (56) References Cited

U.S. PATENT DOCUMENTS

| | | | |
|---|---|---|---|
| 2015/0099816 A1* | 4/2015 | Peters | C08G 18/4816 |
| | | | 521/82 |
| 2015/0197614 A1* | 7/2015 | Chen | C08G 18/6674 |
| | | | 521/112 |
| 2015/0352807 A1 | 12/2015 | Nandi et al. | |
| 2015/0354211 A1* | 12/2015 | Nandi | E04B 2/38 |
| | | | 52/232 |

OTHER PUBLICATIONS

Invista, Terate HT 5349, 2016, Invista.com.
Invista, Terate Polyols Product Data Sheet, 2011, Invista.com.

* cited by examiner

FOAM INSULATION WITH IMPROVED LOW TEMPERATURE PROPERTIES

BACKGROUND OF THE INVENTION

Figure 1:
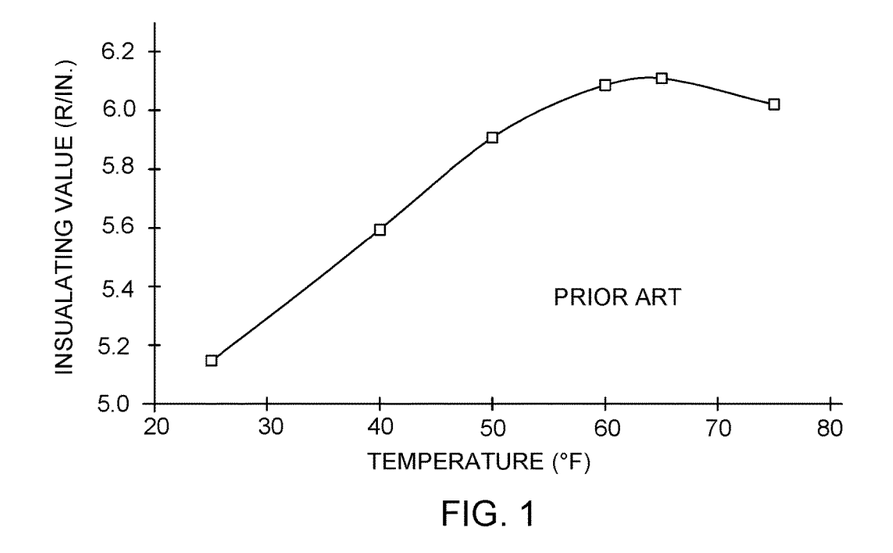
FIG. 1 illustrates the insulation performance of a prior polyisocyanurate foam board as a function of temperature.

Polyisocyanurate foam (i.e., PIR board stock) has been widely used to insulate roofs and walls of commercial and industrial buildings for many decades due to its excellent thermal insulation, flame resistance, and mechanical properties. The insulating performance and other performance of polyisocyanurate foams vary based on temperature. For example, FIG. 1 illustrates the insulation performance of a prior polyisocyanurate foam board as a function of temperature. As is apparent, the insulating value of the board peaks at about 65° F., and drops significantly at colder temperatures, and also drops somewhat at higher temperatures.

While polyisocyanurate foams may provide excellent insulation as compared with some other materials, better performance is often desired at lower temperatures. Other methods have been explored for raising the low temperature performance of polyisocyanurate insulation, for example by changing the blowing agent used in making the foam insulation. However, other methods are still desired for improving the low temperature performance of polyisocyanurate foam insulation.

BRIEF SUMMARY OF THE INVENTION

Embodiments of the present technology may improve the performance of thermal insulation at low temperatures.

According to one aspect, a polyisocyanurate foam insulation product is produced from an isocyanate component and a polyol-containing component including a blowing agent. The polyol-containing component comprises one or more polyols, a fire retardant, and one or more surfactants. The polyisocyanurate foam insulation product has an R-value per inch of at least 5.7 when measured at 40° F.

According to another aspect, an insulated structure comprises a plurality of structural support members coupled together to form a frame, and a plurality of polyisocyanurate foam insulation boards attached to an exterior side of the frame to form an insulation layer. Each of the polyisocyanurate foam insulation boards comprises a polyisocyanurate core produced from an isocyanate component and a polyol-containing component including a blowing agent. The polyol-containing component comprises one or more polyols, a fire retardant, and one or more surfactants, and the polyisocyanurate foam insulation product has an R-value per inch of at least 5.7 when measured at 40° F.

According to another aspect, a roof system comprises a structural deck positioned atop joists or other support members of the roof system, a plurality of polyisocyanurate foam insulation boards positioned atop the structural deck to form an insulation layer for the roof system, and a waterproof membrane positioned atop the plurality of polyisocyanurate foam insulation boards to form a waterproof layer for the roof system. Each polyisocyanurate foam insulation board includes a polyisocyanurate core produced from an isocyanate component and a polyol-containing component including a blowing agent. The polyol-containing component comprises one or more polyols, a fire retardant, and one or more surfactants, and the polyisocyanurate foam insulation product has an R-value per inch of at least 5.7 when measured at 40° F.

DETAILED DESCRIPTION OF THE INVENTION

Polyisocyanurage foams, also called "polyiso" foams may be made by combining separate liquid mixtures that include the polyisocyanates (the A-side mixture) and the polyols (the B-side mixture). The A-side mixture and B-side mixture mix together to form the polyiso foam product.

While similar classes of reactants are used for polyisocyanurate (PIR) and polyurethane (PUR) foam formulations, the PIRs are formed under conditions that promote the trimerization of the polyisocyanate reactants into isocyanurate rings. The reaction scheme below shows the formation of a isocyanurate ring from the trimerization of three generic diisocyanate molecules:

The polyisocyanate reactants (e.g., diisocyanate reactants) still leave active isocyanate groups on the isocyanurate ring after trimerization which can react with additional polyisocyanurate reactants and the polyol reactants. The isocyanurate rings react with the polyols to form a cross-linked polyisocyanurate polymer. When the polyisocyanurate polymer is formed with the help of a blowing agent, it forms a PIR foam. The presence of the isocyanurate rings in the molecular structure of a PIR foam normally impart greater stiffness and higher resistance to chemical and thermal breakdown compared with polyurethane foams.

Because a distinguishing characteristic of the PIR formation is the trimerization of the isocyanate reactant to form isocyanurate rings, PIR formulations generally have a larger molar portion of the polyisocyante to polyol, and include polyisocyanate trimerization catalysts. In many instances, the polyols used in the formulations are also different.

The A-side mixture may include one or more polyisocyanate compounds. Example polyisocyanates may include substituted or unsubstituted polyisocyanates, and may more specifically include aromatic, aliphatic, and cycloaliphatic polyisocyanates having at least two isocyanate functional groups. Specific example aromatic polyisocyanates include 4,4'-diphenylmethane diisocyanate (MDI), polymeric MDI (PMDI), toluene disisocyanate, and allophanate modified isocyanate. A commercial example of a isocyanate formulation that may be used in the present formulations is Wannate® PM-700 manufactured by Wanhua Chemical Group Co., Ltd. of Yantai, China. This isocyanate formulation may have a viscosity of about 600 mPa at 25° C., a functionality of about 2.9, and an isocyanate content of about 30.4%.

The B-side mixture of the polyiso foam may include one or more polyol compounds. The polyol typically includes either or both a polyether and polyester having a hydroxyl number between about 25 and 500, and more commonly between about 200 and 270. The hydroxyl number is a measure of the concentration of the hydroxyl group in the polyol, which is expressed as the milligrams of KOH (potassium hydroxide) equivalent to the hydroxyl groups in one gram of polyol. Polyether is commonly not used in conventional polyisocyanurate foam boards because it is typically less flame resistant than the aromatic polyester that is used in such boards. A lower hydroxyl number commonly results in longer polymer chains and/or less cross linking, which results in a relatively loose polymer chain. In contrast, a higher hydroxyl number commonly results in more cross linking and/or shorter polymer chains, which may provide enhanced mechanical properties and/or flame resistance Example polyols may include polyether polyols, polyester polyols, polycarbonate polyols, aromatic polyols (including polyester polyols, PET-based polyols, and polyamide-based polyols), and mannich polyols. Polyether polyols may be made by polymerizing one or more types of epoxides, such as ethylene oxide or propylene oxide. The may also be made by polymerizing the epoxide with a polyol such as a diol (e.g., glycol), triol (e.g., glycerin), or other polyol. Example polyether polyols may include polyether diols such as polyether polyethylene glycol, polypropylene glycol, and poly(tetramethylene ether) glycol, among other polyether diols.

Polyester polyols may be made by the stepwise polymerization of polyols and polycarboxylic acids. For example, polyester polyols may be formed by the reaction of a glycol such as diethylene glycol with a dicarboxylic acid such as phthalic acid to form an aromatic polyester polyol. Commercially available polyester polyols that may be used with the present formulations include those sold by Invista, including Terate® HT 5503 and Terate® HT 5349. Terate® HT 5503 may have a hydroxyl number between 224 and 245, and a functionality of about 2.0. Terate® HT 5349 may have a hydroxyl number between 295 and 315, and a functionality of about 2.45. The polyols used may be only polyester polyols and may exclude other polyols.

Polycarbonate polyols are a special class of polyester polyol, which can be produced through polycondensation of diols with phosgene or transesterification of diols, such as hexane diol, with carbonic acid ester. Polycarbonate polyols may be produced from propylene oxide and carbon dioxide blended with dibasic ester under catalytic condition. The carbon dioxide may account for approximately 40% of the polyol mass. The polyol may have a functionality of about 2.0 and may have hydroxyl number of about 72. Commercial available polycarbonate polyols include Converge Polyol sold by Novomer, now Saudi Aramco. The polycarbonate polyol may be used as blend with polyester polyol such as Terate® HT 5503.

Catalysts used in polyisocyanurate foam formulations normally include trimerization catalysts that catalyze the formation of cyclic isocyanurate trimers from the polyisocyanate reactant. Example trimerization catalysts include tertiary amines, such as 1, 3, 5-tris(3-(dimethylamino)propyl)-hexahydro-triazine and quaternary ammonium salts, such DABCO-TMR and DABCO-TMR2 sold by AirProducts now Evonik. Example catalysts may also include metal catalysts, such as potassium octoate and potassium acetate. Example catalysts that may be useful in embodiments of the invention include OMG 977™ and OMG 1123™ catalysts sold by Borchers OM Group, and TMR-20™ catalyst sold by Evonik. Quaternary ammonium salts, such as TMR™ or TMR2™, and metal catalysts, such as TMR-20™, are particularly effective in promoting trimer formation at high index.

The present polyisocyanurate formulations may also include one or more surfactants. The surfactants function to improve compatibility of the formulation components and stabilize the cell structure during foaming. Example surfactants can include organic or silicone based materials, or non-silicone materials. Example surfactants that may be useful in embodiments of the invention include Vorasurf™ sold by The Dow Chemical Company and DC 193 sold by Dow Corning Company.

The present polyisocyanurate formulations may also include the non-halogenated and/or halogenated fire retardants. In some embodiments, the polyisocyanurate formulation may include a halogenated fire retardant such as tris(2-chloroisopropyl) phosphate (TCPP). In some embodiments, a non-halogenated fire retardant may include a non-halogenated fire retardant such as diethyl hydroxylmethyl phosphonate (DEHMP). The non-halogenated fire retardant may reduce the amount of halogenated fire retardants such as TCPP use in the foams. The polyisocyanurate core may be able to form a sufficiently stable char when exposed to flame conditions in accordance with ASTM E-84. The stable char enables the polyisocyanurate core to pass the ASTM E-84 test. The polyisocyanurate foam insulation boards may exhibit an ASTM E1354-11b performance that is equivalent with or better than a similar polyisocyanurate foam insulation board having a halogenated fire retardant tris(2-chloroisopropyl) phosphate (TCPP) or without a non-halogenated fire retardant.

The phosphorus containing non-halogenated fire retardant may include: an organo-phosphate, an organo-phosphite, and/or an organo-phosphonate. The non-halogenated organa phosphorus fire retardant could be non-reactive or reactive, i.e. containing isocyanate reactive functionality. An example non-reactive organa phosphorus fire retardant is a blend of butyl diphenyl phosphate, dibutyl phenyl phosphate, and triphenyl phosphate. An example reactive organa phosphorus fire retardant is diethyl hydroxylmethyl phosphonate (DEHMP). In other embodiments, the phosphorous containing non-halogenated fire retardant may include: dialkyl hydroxyalkanephosphonate (e.g., dimethyl hydroxymethylphosphonate), diaryl hydroxyalkanephosphonate (e.g., diphenyl hydroxymethylphosphonate), and the like.

Select embodiments of the present polyisocyanurate formulations may further include one or more of initiators and carbohydrates. Unlike catalysts, an initiator is consumed during the polymerization reaction and becomes part of the polyiso foam product. Example initiators may include aliphatic and aromatic polyamines, such as ethylene diamine, toluene diamines such as a combination of 3,5-diethyltoluene-2,4-diamine and 3,5-diethyltoluene-2,6-diamine sold under the tradename Ethacure® 100 by Albemarle Corp, and polyetheramines such as Jeffamine® T-403 and D-230 sold by Huntsman Corporation, among others. A carbohydrate may include a monosaccharide, an oligosaccharide, and/or a polysaccharide. Specific examples include sucrose and/or high-fructose corn syrup (HFCS), among other carbohydrates. While the carbohydrates include a plurality of hydroxyl groups, they are not believed to react with the polyisocyanates to as great an extent as the urethane polyols, and in some formulations they may not react at all.

The blowing agents used to make the foam may include hydrocarbon gas (e.g., n-pentane, isopentane, cyclo-pentane, etc.) and/or fluorocarbon gas, among others. The blowing agent may include a mixture of isopentane and n-pentane. Specific examples of fluorocarbon gases may include HFC-245fa (i.e., 1,1,1,3,3-pentafluoropropane) commercially available under the tradename Enovate® from Honeywell Corp., HFC-365mfc (i.e., $CF_3CH_2CF_2CH_3$), HFC-134a (i.e., 1,1,1,2-tetrafluoroethane), HCFO 1233zd (i.e., trans-1-chloro-3,3,3-trifluoropropene) sold under tradname Solstice® LBA by Honeywell Corp., Forane® 1233zd by Arkema, and HFO-1336mzz (1,1,1,4,4,4-hexafluoro-2-butene) sold under trade name Opteon 1100 by Chemours. The blowing agent may be in the B-side mixture. In some embodiments, the blowing agent is a 50/50 mixture of n-pentane and isopentane.

In some embodiments, water may react with isocyanate in the mixture to generate carbon dioxide, which acts as a blowing agent.

The B-side mixture may also include an emulsifier.

An example formulation for a polyiso foam insulation may have an isocyanate index greater than about 2.50, including from 2.50 to 2.70 and from 2.70 to 3.50. When a polyisocyanate reacts with a polyol to form a urethane bond, one NCO group reacts with one OH group. As is known in the art, the index is defined as the ratio of NCO group to OH group as shown in the formula below:

$$\text{Index} = \frac{\text{Moles of NCO group}}{\text{Moles of OH group}}$$

When the number of NCO groups equals the number of OH groups in a formulation, a stoichiometric NCO:OH ratio of 1.0 is realized and a polyurethane polymer/foam is produced. When the number of NCO groups is significantly more than the number of OH groups in a formulation, the excess isocyanate group reacts with itself under catalytic condition to form isocyanurate linkage and polyisocyanurate foam is produced. The above described isocyanate index, and especially an index of between about 2.50 and 2.70, provides at least a 2:1 ratio of NCO groups to OH groups, which has been found to provide an appreciable combination of structure integrity, thermal strength and/or stability, and fire resistance. Some embodiments may have an isocyanate index of at least 3.0, for example about 3.25.

A polyiso formulation embodying the invention may also have a metallo-organic compound as part of its B-side mixture. For example a compound of zinc or bismuth with various coordinating organic ligands may be used, and may impart favorable properties to the resulting foam. An example of an additive including a zinc compound and usable in embodiments of the invention is KKAT®XK-614 Zinc complex available from King Industries, Inc. USA. An example of a bismuth additive usable in embodiments of the invention is KKAT®-XC-C227 Bismuth complex, 2-ethyl-hexanoic acid (CAS 149-57-5) also sold by King Industries, Inc. USA. In some embodiments, the metallo-organic compound may include carbon, and may be for example a zinc salt such as a zinc carboxylate. In some embodiments, the metallo-organic compound may be about 0.1 to 1.0 weight percent of the B-side mixture.

Figure 2:
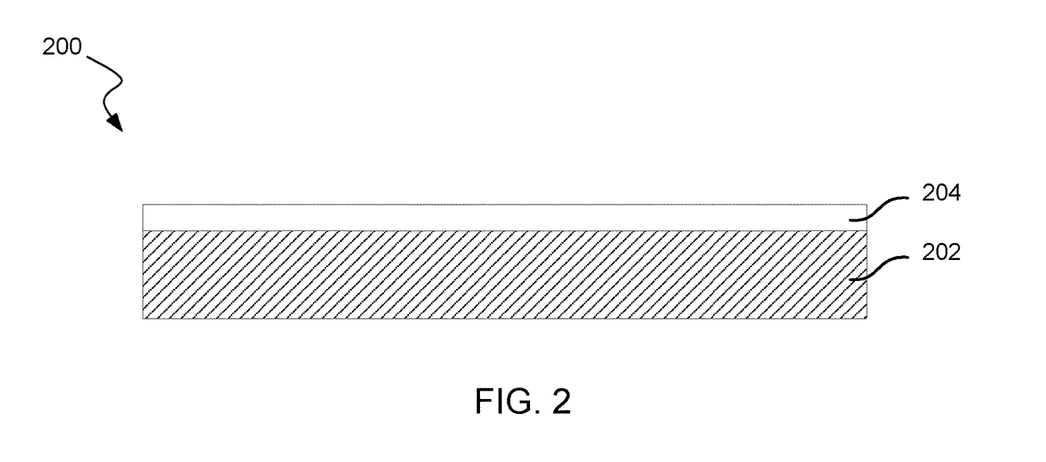
FIG. 2 illustrates an embodiment of a polyisocyanurate foam board.

Referring now to FIG. 2, illustrated is an embodiment of a polyisocyanurate foam board 200 (hereinafter foam board 200). The foam board 200 includes a polyisocyanurate core 202 that is produced from an isocyanate, a polyol, and a blowing agent in accordance with embodiments of the invention. The polyisocyanurate core 202 typically has an average foam cell size of less than about 200 microns, and more commonly between about 100-150. In contrast, conventional foam boards typically have an average foam cell size of between about 200 and 300. The smaller foam cell size of the polyisocyanurate core 202 may enable the core to exhibit an increased R-value when compared with conventional cores. In some embodiments, a polyisocyanurate foam preferably has a cell size of less than 120 microns.

R-values herein are measured according to ASTM standard test method C518.

In some embodiments, the polyisocyanurate core 202 may include between 1 and 10 weight percent of a hydrocarbon blowing agent, such as any blowing agent described herein. In an example embodiment, the polyisocyanurate core 202 may include between 5 and 8 weight percent of the hydrocarbon blowing agent. The weight percent of the hydrocarbon blowing agent typically corresponds with the foam density of the polyisocyanurate core 202 with lower density foam boards (e.g., insulation boards) having a higher weight percentage of the hydrocarbon blowing agent than more dense foam boards (e.g., roofing cover boards). For example, insulation boards having a density of between about 1.5 and 2.5 pounds per cubic foot (lbs/ft$^3$), commonly have 5% or more of a hydrocarbon blowing agent by weight, and more commonly between about 6 and 7 weight percent. In contrast, roofing cover boards that have a density of up to 10 lbs/ft$^3$, and more commonly between 6 and 7 lbs/ft$^3$, commonly have less than 5% of a hydrocarbon blowing agent by weight, and more commonly between about 1.5 and 3 weight percent.

The foam insulation board may have different densities. For example, a lower density foam insulation board may have a density of between about 1.5 and 2.5 lbs/ft$^3$, including between about 1.6 and 1.8 lbs/ft$^3$. A higher density foam cover board may have a foam density of up to 12 lbs/ft$^3$, including between about 6 and 7 lbs/ft$^3$. For insulation purposes, a foam insulation board in accordance with embodiments of the invention preferably has a density of less than 2.0 lbs/ft$^3$, and more preferably less than 1.7 lbs/ft$^3$, and even more preferably less than 1.61 lbs/ft$^3$.

Foam board 200 also includes an optional facer material 204 that is applied to at least one surface of the polyisocyanurate core 202. The facer material 204 typically includes a glass fiber mat, but may include other types of facer materials. The facer material 204 is typically selected based on the type of polyisocyanurate foam board produced. For example, facers for polyisocyanurate foam insulation boards that are used in roofing applications may include: a reinforced cellulosic felt facer, an un-coated polymer bonded glass fiber mat, a coated polymer bonded glass fiber mat, and the like. In such embodiments, the facer 204 may include a mineral and/or pigment based coating with high solid content to provide one or more desired characteristics, such as low porosity, fire retardancy, mechanical strength, and the like. The facer 204 may have a thickness of between about 0.3 and 1.2 mm.

Facers for polyisocyanurate foam cover boards that are used in roofing applications may include: coated polymer bonded glass fiber mat, which provides desired characteristics, such as low porosity, fire retardancy, mechanical strength, and the like. In such embodiments, the facer 204 may have a thickness of between about 0.4 and 1.2 mm. Facers for polyisocyanurate foam boards that are used in wall applications may include a metal foil facer that is configured to reflect heat, such as from and/or into a structure, and/or may include an un-coated polymer bonded glass mat, coated polymer bonded glass mat, and the like. In such embodiments, the facer 204 may have a thickness of between about 0.006 and 1.2 mm. The thickness of 0.006 mm typically represents the thickness of a metal facer while the 1.2 mm represents the thickness of other facers.

Although FIG. 2 shows the facer 204 being positioned on a single side of the polyisocyanurate core 202, it should be realized that in many embodiments an additional facer may be positioned on the opposite side of the polyisocyanurate core 202. The additional facer may be a similar or different facer than facer 204 and/or may have a different thickness and/or material coating as desired.

The polyisocyanurate foam board 200 commonly has a density of between about 1.45 and 12 lbs/ft$^3$, and more commonly between 1.5 and 7.5 lbs/ft$^3$. In an example embodiment, a polyisocyanurate foam cover board may have a density of between about 4 and 8 lbs/ft$^3$, and more commonly between about 6 and 7 lbs/ft$^3$; a polyisocyanurate foam insulation roofing board may have a density of between about 1.5 and 2.0 lbs/ft$^3$, and more commonly between about 1.6 and 1.7 lbs/ft$^3$; and a polyisocyanurate foam sheathing board may have a density of between about 1.5 and 2.5 lbs/ft$^3$, and more commonly between about 1.6 and 2.0 lbs/ft$^3$.

Figure 3:
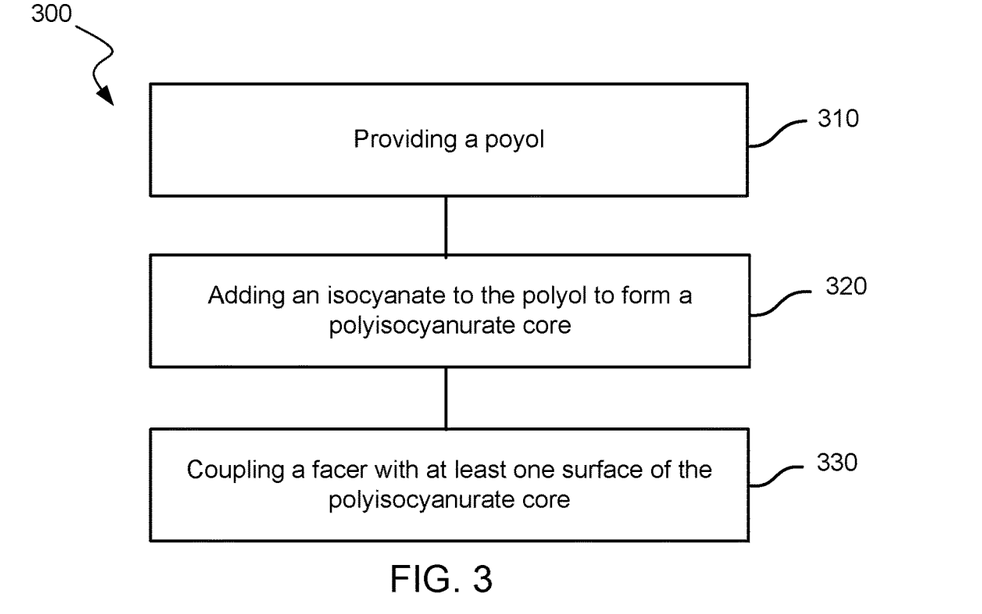
FIG. 3 illustrates is a method of forming a polyisocyanurate foam board, in accordance with embodiments of the invention.

Referring now to FIG. 3, illustrated is a method of forming a polyisocyanurate foam board. At block 310, a polyol is provided. At block 320, an isocyanate is added to the polyol to form a polyisocyanurate core having an isocyanate index greater than about 2.00. A fire retardant may be added the polyisocyanurate core. At block 330, a facer material is coupled with at least one surface of the polyisocyanurate core. The facer material includes a glass fiber mat, or other mat, that may be selected based on the end application of the polyisocyanurate foam board as described herein. In some embodiments, an additional facer material may be coupled with an opposite surface of the polyisocyanurate core.

The resulting polyisocyanurate core may have an R-value as described herein. In some embodiments, the method may also include adding between 1 and 10 weight percent of a hydrocarbon blowing agent to the polyisocyanurate core.

Example Foam Formulations

An example formulation prepared in accordance with embodiments of the invention in a small batch is as shown in Tables 1 and 2 below, and is designated Example 1.

TABLE 1

Example 1 B-Side
B-Side Formulation

| Ingredient | Wt (lb) | Parts | Batch Wt % |
|---|---|---|---|
| Invista HT5503 | 39.7 | 50 | 32.4 |
| Invista HT5349 | 39.7 | 50 | 32.4 |
| DEHMP | 13.5 | 17 | 11.0 |
| Vorasurf 504 | 2.4 | 3 | 1.9 |
| TMR 20 | 1.4 | 1.8 | 1.2 |
| KKAT ®XK-614 (Zinc) | 0.5 | .6 | 0.4 |
| OMG 977 (k-oct) | 4.6 | 5.8 | 3.8 |
| OMG 1123 (K-Ace) | 0.5 | 0.6 | 0.4 |
| Water | 0.3 | 0.40 | 0.3 |
| Pentane 50/50 i/n | 19.9 | 25.1 | 16.3 |
| Total "B" | 122.5 | 154.3 | 100.0 |

TABLE 2

Example 1 A-Side
A-Side Formulation

| Ingredient | Wt (lb) | Parts | Batch Wt % |
|---|---|---|---|
| Yantai Wannate PM-700 | 227.5 | 286.56 | 100.0 |
| Total "A" | 227.5 | 286.56 | 100.0 |

Figure 4:
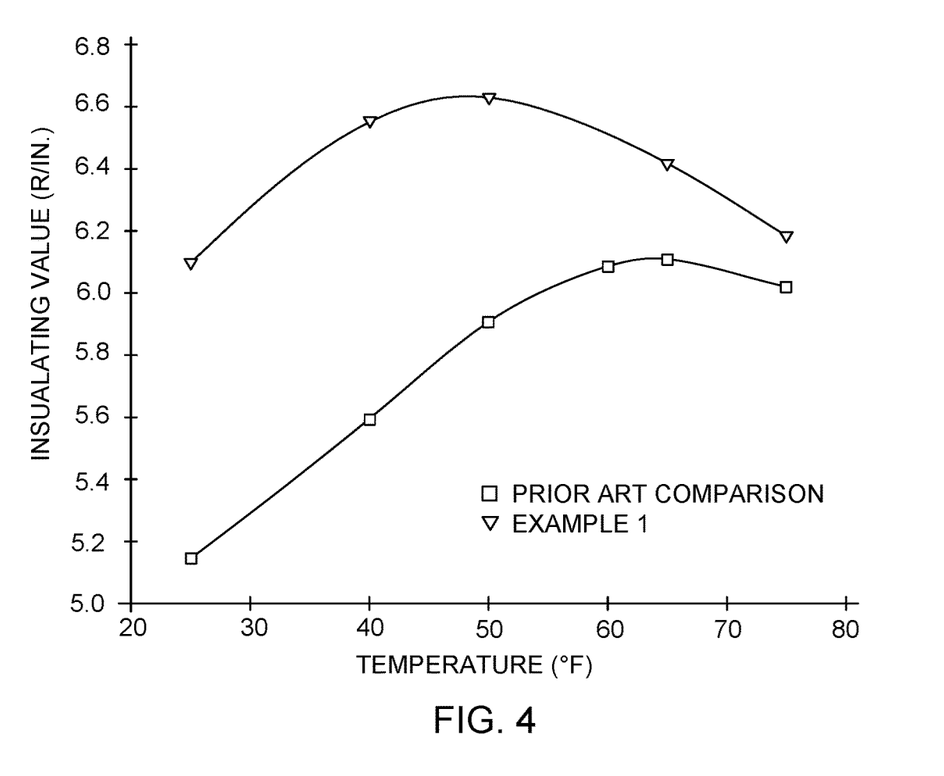
FIG. 4 shows the thermal performance of a board in accordance with embodiments of the invention, as compared with a prior art formulation.

The thermal performance of a board made from the Example 1 formulation is shown in FIG. 4, superimposed with the prior art formulation performance data copied from FIG. 1. The foam of the new formulation shown in FIG. 4 had a density of 1.61 lb/ft$^3$, an index of 3.25, and a cell size of 113 microns. As is apparent, the insulating value of Example 1 is significantly improved over the performance of the prior art control sample at all temperatures in the tested range, but especially at lower temperatures. In addition, the peak R-value is surprisingly shifted from about 67° F. to about 48° F.

Table 3 below gives the formulations for the B-side mixture of Example 1 and other example embodiments. All of these examples used a blowing agent having a 50/50 mixture of n-pentane and isopentane.

TABLE 3

| Example Number | Polyol Used | Fire Retardant Used | Metallo-Organic Component | Cell Size (microns) | Index |
|---|---|---|---|---|---|
| 1 | HT 5503 HT 5349 | DEHMP | KKAT ®XK-614 (Zinc) | 113 | 3.25 |
| 2 | HT 5503 | DEHMP | None | 165 | 3.25 |
| 3 | HT 5503 | TCPP | None | 173 | 3.25 |
| 4 | HT 5503 HT 5349 | DEHMP | None | 130 | 3.25 |
| 5 | HT 5503 | DEHMP | KKAT ®XK-614 (Zinc) | 157 | 3.5 |
| 6 | HT 5503 | DEHMP | None | 150 | 3.5 |
| 7 | HT 5503 | DEHMP | KKAT ®XK-614 (Zinc) | 158 | 3.25 |
| 8 | HT 5503 | TCPP | KKAT ®XK-614 (Zinc) | 182 | 3.25 |

Table 4 gives the performance data for a number of example formulations in numerical form, including the prior art comparative example shown in FIG. 1 and Example 1 described above. Each of the tested samples was 2 inches thick and included a glass-reinforced paper facer.

TABLE 4

| Example Number | R/in. at 25° F. | R/in. at 40° F. | R/in. at 50° F. | R/in. at 60° F. | R/in. at 65° F. | R/in. at 75° F. |
| --- | --- | --- | --- | --- | --- | --- |
| Comparative | 5.144 | 5.593 | 5.907 | 6.086 | 6.109 | 6.020 |
| 1 | 6.097 | 6.555 | 6.627 |  | 6.418 | 6.184 |
| 2 | 5.537 | 6.044 | 6.243 | 6.257 |  | 6.001 |
| 3 | 5.155 | 5.717 | 6.017 | 6.130 | 6.106 | 5.933 |
| 4 | 5.909 | 6.405 | 6.538 | 6.479 | 6.388 | 6.162 |
| 5 | 5.785 | 6.270 | 6.383 | 6.299 | 6.198 | 5.977 |
| 6 | 5.422 | 5.958 | 6.162 | 6.186 | 6.117 | 5.911 |
| 7 | 5.708 | 6.157 | 6.282 | 6.249 | 6.171 | 5.957 |
| 8 | 5.277 | 5.854 | 6.155 | 6.268 | 6.247 | 6.077 |

Figure 5:
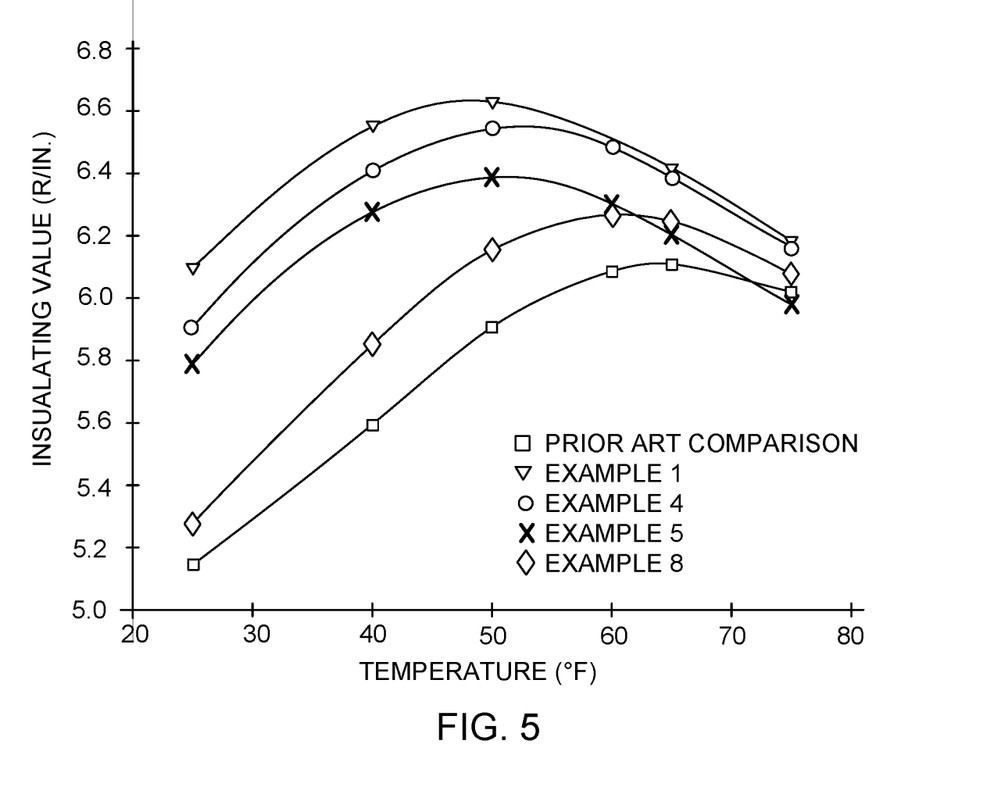
FIG. 5 graphically illustrates the thermal performance of several polyisocyanurate formulations, as compared with a prior art formulation.

All of the embodiments listed in Table 4 exhibit improved thermal performance across some or all of the tested temperature range, as compared with the prior art comparative sample. FIG. 5 graphically illustrates the thermal performance of Examples 1, 4, 5, and 8, which encompass several different formulations and exhibit significant improvements over the prior art. The improvements were obtained without changes in the blowing agent. The prior art comparative sample included TCPP as a fire retardant and one di-functional polyester polyol, and had an index of about 2.60. The prior art formulation did not include a zinc complex.

In general, polyisocyanurate foam formulations in accordance with embodiments of the invention may include any one or more components in the amounts shown in Table 5 below.

TABLE 5

| Component | B-Side wt % | Preferred B-Side wt % | More preferred B-Side wt % |
| --- | --- | --- | --- |
| Polyol(s) | 70-90 | 75-85 | 79-81 |
| Fire retardant(s) | 5-15 | 8-13 | 10-12 |
| Surfactant(s) | 0.5-4 | 1-3 | 1.5-2.5 |
| Catalyst(s) | 2-10 | 4-8 | 5-6 |
| Metallo-organic compound(s) | 0.1-10 | 0.2-5 | 0.3-1.0 |

Example Wall Systems or Insulated Structures

Wall structures or systems of commercial and residential structures are commonly insulated by filling a wall cavity that is positioned between wall studs (wood or metal). The wall cavity may be filled using a spray foam insulation, batt or roll insulation (e.g., fiberglass, mineral wool, cotton, and the like), loose fill insulation (e.g., fiberglass, cellulose, mineral wool, and the like), or a combination thereof. Thermal bridging from the wall studs can reduce the effectiveness of the cavity insulation. To reduce the effects of thermal bridging, the wall system or structure may include external sheathing insulation (e.g., continuous external sheathing), such as with a foil faced rigid polyisocyanurate foam board, that is coupled with the cavity insulation.

Figure 6:
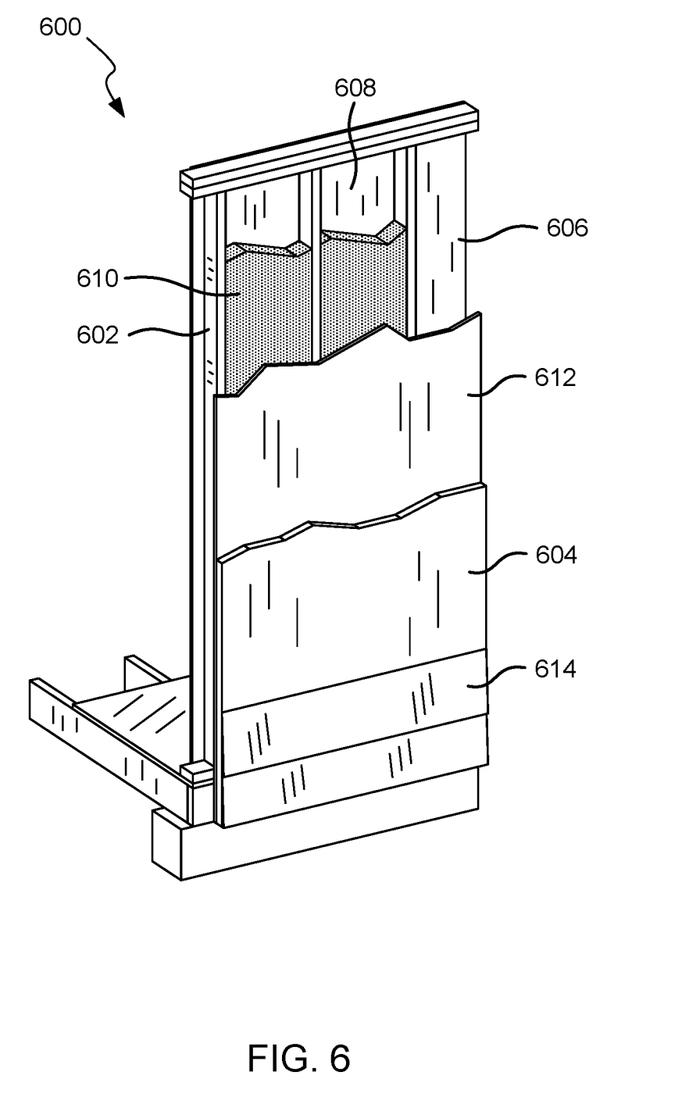
FIG. 6 illustrates a wall system or structure in accordance with embodiments of the invention.

Referring now to FIG. 6, illustrated is an embodiment of a wall system or structure 600 that may be used to insulate a commercial or residential structure. Wall system 600 includes a plurality of structural support members or wall studs 602 that are coupled together to form a wall frame. A plurality of foam boards 604 (hereinafter sheathing boards 604) are attached to an exterior side of the frame to form an insulative exterior wall or surface of the wall system 600 (i.e., continuous external sheathing insulation). A plurality of wall boards 606 are attached to an interior side of the frame opposite the sheathing boards 604 to form an interior wall or surface of the wall system 600. Example wall boards 606 include gypsum boards and the like. The wall studs 602, sheathing boards 604, and wall boards 606 define a plurality of wall cavities 608.

Fasteners (not shown) are used to attach the sheathing boards 604 and wall boards 606 to the respective sides of the frame. Each fastener may include an elongate shaft that penetrates through a respective board and into a wall stud 602 to couple the components together. Example fasteners include nails and screws, although in some embodiments non-mechanical fasteners may be used, such as adhesives and the like. An insulation material 610 is positioned within at least one of the wall cavities 608 of the wall system, and more commonly within each wall cavity 608 or within most of the wall cavities. The insulation material 610 is positioned within the wall cavity 608 to insulate the building or structure. As described herein, example insulation materials include spray foam insulation (open cell and/or close cell), batt or roll insulation (e.g., fiberglass, mineral wool, cotton, and the like), loose fill insulation (e.g., fiberglass, cellulose, mineral wool, and the like), or a combination thereof. The spray foam insulation may be any spray foam insulation described herein.

In some embodiments, an additional wall board 612 may be attached to the exterior side of the frame. In some embodiments, the additional wall board 612 may be free of a halogenated fire retardant. The additional wall board 612 may be a gypsum board, cement board, oriented strand board (OSB), plywood, and the like. Wall board 612 may be positioned between the sheathing board 604 and frame or wall studs 602 for structural support and/or other purposes. External veneer or cladding 614 (hereinafter exterior cladding 614) may be positioned on an exterior side of the sheathing boards 604. In some embodiments, the exterior cladding 614 may be free of a halogenated fire retardant. The exterior cladding 614 may include brick, stucco, rock, siding, paneling, and the like that provides the structure with an aesthetic appeal while optionally also providing one or more desired mechanical or other characteristics. In some embodiments, a drainage cavity or barrier may be positioned between one or more of the components of the wall system, such as between the exterior cladding 614 and the sheathing boards 604. The wall system 600 may also include other components, layers, and/or materials that are not shown, such as an interior vapor barrier, flashing, primer, and the like.

As described herein, the sheathing board 604 of wall system 600 include a polyisocyanurate core that is produced from: an isocyanate, a polyol, and a blowing agent. The polyisocyanurate core has an R-value per inch of at least 5.7 when measured at 40° F. The polyisocyanurate core may be any core described herein.

In some embodiments, the sheathing board 604 may also include a foil facer that is attached to an exterior side of the board. The sheathing boards 604 may have a foam density of between about 1.5 and 2.5 lbs/ft$^3$, and more commonly between about 1.6 and 2.0 lbs/ft$^3$. In some embodiments, the polyisocyanurate core also include between 1 and 10 weight percent of a hydrocarbon blowing agent. The sheathing board more commonly include between about 5 and 8 weight percent of the hydrocarbon blowing agent. The sheathing board may be any foam board described herein.

Figure 7:
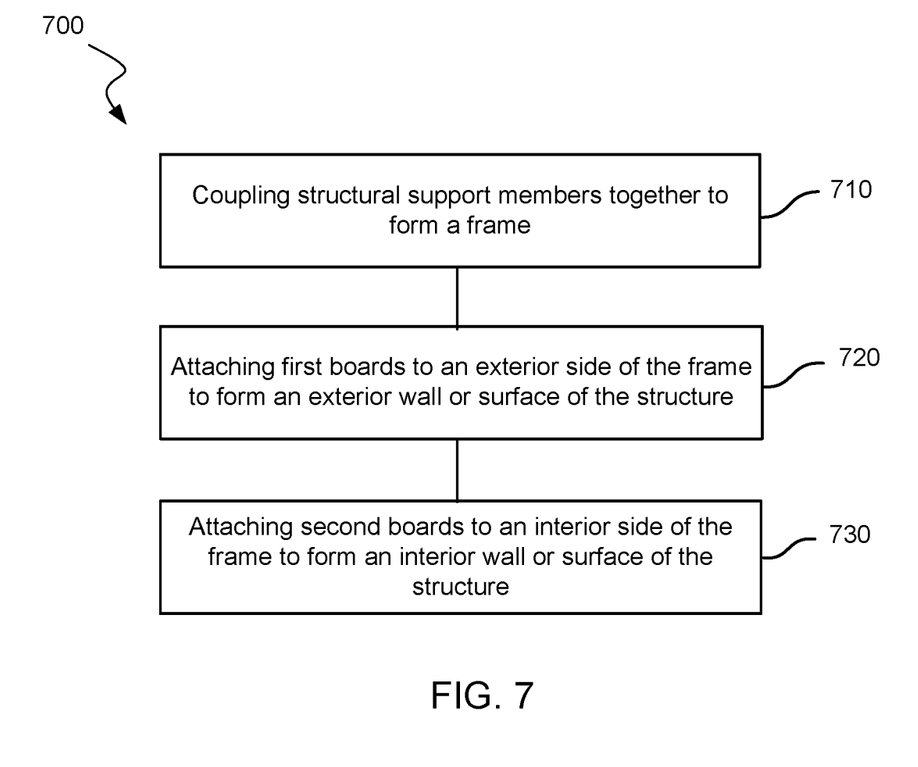
FIG. 7 illustrates a method of forming a wall of a structure in accordance with embodiments of the invention.

Referring now to FIG. 7, illustrated is a method of forming a wall of a structure. At block 710, a plurality of structural support members (i.e., wall studs) are coupled together to form a frame. At block 720, a plurality of first boards (i.e., foam boards or polyisocyanurate sheathing boards) are attached to an exterior side of the frame to form an insulative exterior wall or surface. At block 730, a plurality of second boards (i.e., wall boards) are attached to an interior side of the frame to form an interior wall or surface. The structural support members, foam boards, and wall boards are coupled together to define a plurality of wall cavities. An insulation material (e.g., a spray foam material, a fiberglass material, or a combination thereof) may be positioned within at least one of the wall cavities, and commonly most or all wall cavities, to insulate an interior space of the structure.

As described herein, at least one of the foam boards includes a polyisocyanurate core that is produced from an isocyanate, a polyol, and a blowing agent.

In some embodiments, the method also includes applying between 1 and 10 weight percent of a hydrocarbon blowing agent to the polyisocyanurate core. In some embodiments, the method further includes attaching a foil facer to an exterior side of the polyisocyanurate core. Preferably, the polyisocyanurate core has an R-value per inch of at least 5.7 when measured at 40° F.

Wall systems may include those described in U.S. application Ser. No. 14/299,571, now U.S. Pat. No. 9,523,195, which is incorporated herein by reference for all purposes.

Example Roofing Systems

Commercial and industrial roofing system usually include a combination of layers, such as an insulation layer and a waterproof layer. In some instances, a cover board can be used between the insulation layer and waterproof layer to add fire and/or mechanical protection, such as hail resistance. According to the embodiments herein, a roofing system's insulation layer for commercial and/or industrial roofing includes polyisocyanurate foam boards. The waterproof layer includes a built-up roof, modified bitumen, and/or a single ply membrane, such as thermoplastic olefin (TPO), polyvinyl chloride (PVC), ethylene propylene diene monomer (EPDM), metal, and the like.

Figure 8:
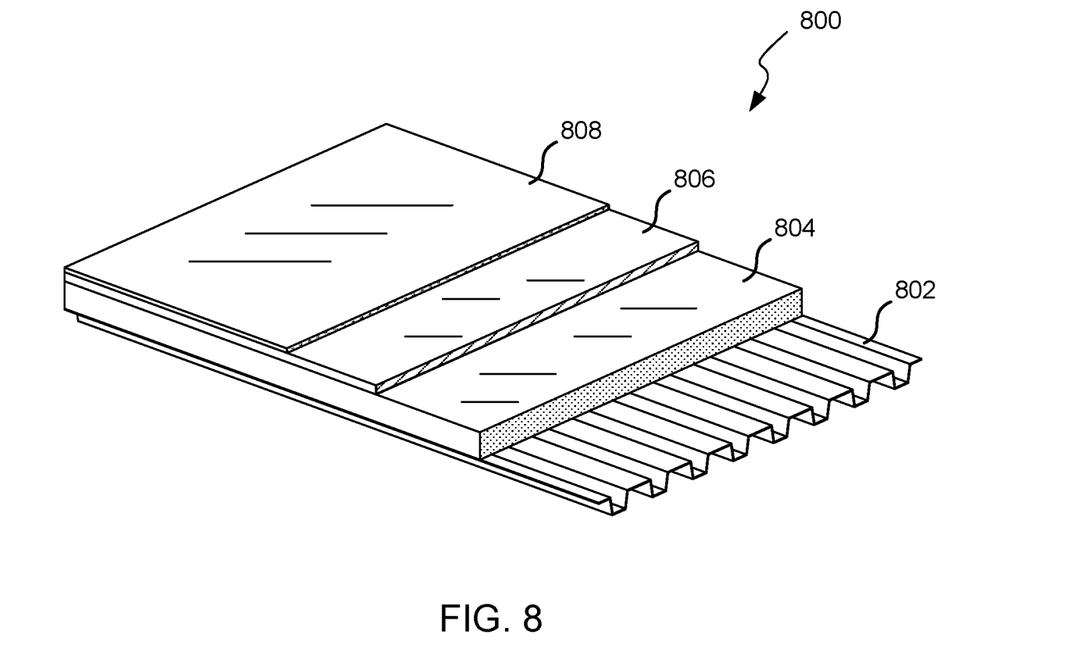
FIG. 8 shows a construction of a commercial roof deck in accordance with embodiments of the invention.

Referring now to FIG. 8, a construction of a commercial roof deck (i.e., roof system 800) is shown. Roof system 800 includes a structural deck 802, which is commonly made of steel or galvanized metal (18 to 22 gauge), although other types of materials and/or sizes are possible. The structural deck 802 is commonly positioned above steel, metal, or other joists and supported thereby. A plurality of foam insulation boards 804 (hereinafter insulation boards 804) are positioned atop the structural deck 802 to form an insulative layer of roofing system 800. As described herein, the insulation boards 804 are preferably polyisocyanurate foam boards having R-value per inch of at least 5.7 when measured at 40° F. The foam board may be any foam board described herein.

In some embodiments, a plurality of cover boards 806 are positioned atop the insulation boards 804 to add a protective layer to roofing system 800. The covers board 806 may be added for fire and/or mechanical protection (e.g., hail or impact resistance) or for various other reasons. In embodiments, the cover boards 806 may include perlite based boards, gypsum based boards, and the like. In some embodiments, the roofing system 800 does not include cover boards 806.

A waterproof membrane 808 is positioned atop the roofing system 800. The waterproof membrane 808 may be positioned atop the cover boards 806, insulation boards 804, and/or another component/layer of the roofing system 800. In some embodiments, the waterproof membrane 808 may include a built-up roof, modified bitumen, thermoplastic olefin (TPO), ethylene propylene diene monomer (EPDM), metal, and the like. The waterproof membrane 808 may be ballasted, adhered, mechanically fastened, and the like atop the roofing system 800 to couple the waterproof membrane 808 with the roofing system's components/layers. Further, individual components of the waterproof membrane 808 may be coupled together to form the waterproof membrane 808. For example, individual TPO segments, sheets, or strips may be heat welded together to form a substantially continuous TPO layer atop the roofing system 800. Similarly, individual EPDM segments may be adhered or bonded together and metal segments may be mechanically fastened or bonded to form a substantially continuous waterproof membrane layer.

The roofing system 800 may be slightly sloped to promote drainage of water and/or for various other reasons as desired. The roof system 800 may also include other components, layers, and/or materials that are not shown, such as bonding cement, primer, acoustic infills, and the like.

As described herein, the insulation boards 804 and/or cover boards 806 are polyisocyanurate foam boards that include a polyisocyanurate core. The polyisocyanurate core is produced from an isocyanate, a polyol, and a blowing agent. The polyisocyanurate core may be any core described herein.

In some embodiments, each of the insulation boards 804 also includes a facer that is coupled with one or more surfaces of the insulation board 804, commonly both surfaces. The facer typically includes a glass fiber mat, but may include other types of facer materials. The facer may include: a reinforced cellulosic felt facer, an un-coated polymer bonded glass fiber mat, a coated polymer bonded glass fiber mat, and the like. The facer may be coated or uncoated as desired to provide a desired characteristic, such as fire retardancy, mechanical strength, and the like. The insulation board 804 may have a foam density of between about 1.5 and 2.0 lbs/ft$^3$, and more commonly between about 1.6 and 1.7 lbs/ft$^3$. In some embodiments, the insulation board's polyisocyanurate core also includes between 1 and 10 weight percent of a hydrocarbon blowing agent. The insulation boards 804 commonly include between about 5 and 8 weight percent of the hydrocarbon blowing agent.

In some embodiments, each of the cover boards 806 also includes a facer that is coupled with one or more surfaces of the cover board 806, commonly both surfaces. The facer typically includes a glass fiber mat, but may include other types of facer materials. The cover board 806 may have a foam density of between about 3 and 8 lbs/ft$^3$, and more commonly between about 6 and 7 lbs/ft$^3$. In some embodiments, the cover board's polyisocyanurate core also includes between 1 and 10 weight percent of a hydrocarbon blowing agent, which may be a highly flammable material as described herein above. The cover boards 806 commonly include between about 1.5 and 3 weight percent of the hydrocarbon blowing agent.

Figure 9:
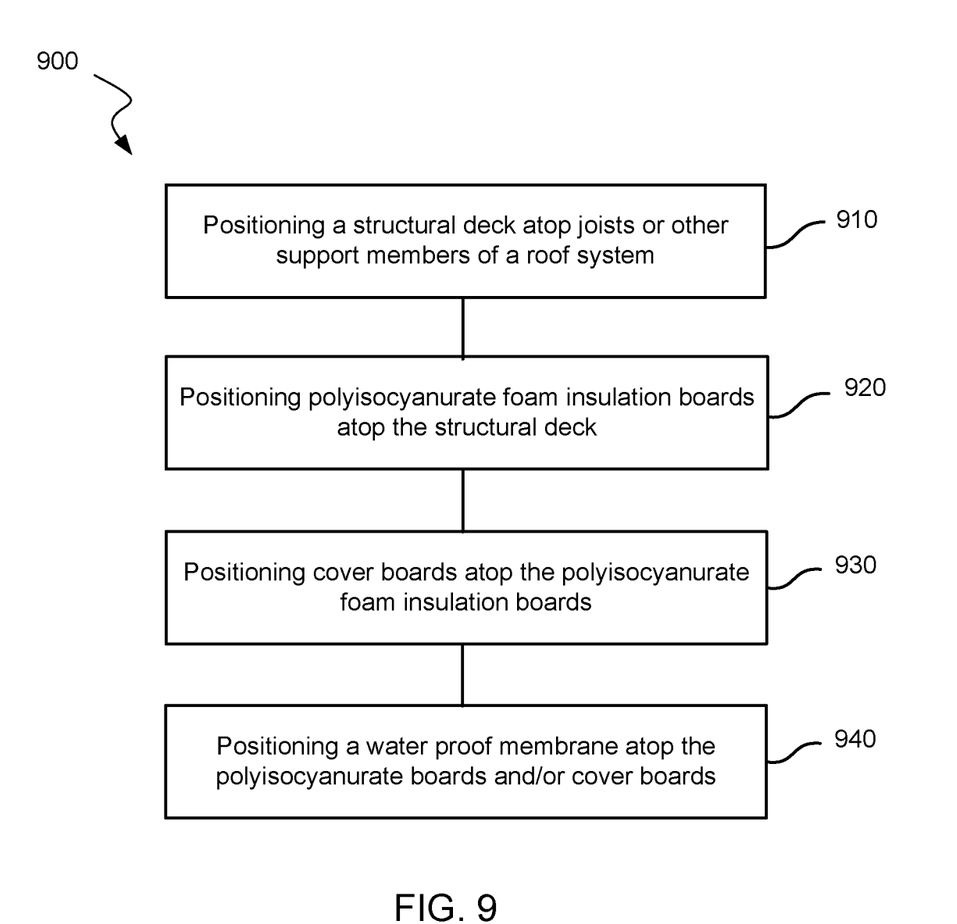
FIG. 9 illustrates a method of forming a roofing system in accordance with embodiments of the invention.

Referring now to FIG. 9, illustrated is a method 900 of forming a roofing system of a structure. At block 910, a structural deck is assembled atop joists (metal and the like) or other structurally supporting members. At block 920, a plurality of foam insulation boards (i.e., polyisocyanurate foam roof insulation boards) are positioned atop the structural deck to provide an insulation layer for the roofing system. At block 930, a plurality of cover boards are optionally positioned atop the foam insulation boards to form a protective layer for the roofing system. At block 940, a waterproof membrane is positioned atop the foam insulation boards and/or cover boards to provide a waterproof layer for the roofing system.

As described herein, at least one of the foam insulation boards includes a polyisocyanurate core that is produced from an isocyanate, a polyol, and a blowing agent. The polyisocyanurate core may be any polyisocyanurate core described herein, and preferably has an R-value per inch of at least 5.7 when measured at 40° F.

In some embodiments, at least one of the cover boards includes a polyisocyanurate core that is produced from an isocyanate, a polyol, and a blowing agent. In some embodiments, the method includes applying between 1 and 10 weight percent of the blowing agent to the polyisocyanurate core of the foam insulation board(s) and/or cover board(s). In some embodiments, the method further includes attaching a facer to at least one surface of the foam insulation board(s) and/or cover board(s).

Roofing systems may include those described in U.S. application Ser. No. 14/299,631, now U.S. Pat. No. 9,528,269, which is incorporated herein by reference for all purposes.

All patents, patent publications, patent applications, journal articles, books, technical references, and the like discussed in the instant disclosure are incorporated herein by reference in their entirety for all purposes.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A polyisocyanurate foam insulation product produced from:
    an isocyanate component; and
    a polyol-containing component including a blowing agent;
    wherein the polyol-containing component comprises a first polyol and a second polyol, a fire retardant, and one or more surfactants, wherein the first polyol and the second polyol have different hydroxyl numbers, or have different functionalities, or differ in both hydroxyl number and functionality;
    and wherein the polyisocyanurate foam insulation product has an R-value per inch of at least 5.7 when measured at 40° F.

2. The polyisocyanurate foam insulation product of claim 1, wherein the polyisocyanurate foam insulation product has an R-value per inch of at least 6.0 when measured at 40° F.

3. The polyisocyanurate foam insulation product of claim 1, wherein the polyisocyanurate foam insulation product has an R-value per inch of at least 5.0 when measured at 25° F.

4. The polyisocyanurate foam insulation product of claim 1, wherein the polyisocyanurate foam insulation product has an R-value per inch of at least 5.5 when measured at 25° F.

5. The polyisocyanurate foam insulation product of claim 1, wherein the polyol-containing component further comprises a metallo-organic compound.

6. The polyisocyanurate foam insulation product of claim 5, wherein the polyol-containing component comprises between 0.1 and 1.0 weight percent of a compound containing zinc and an organic complex.

7. The polyisocyanurate foam insulation product of claim 6, wherein the compound comprises a zinc carboxylate.

8. The polyisocyanurate foam insulation product of claim 5, wherein the metallo-organic compound is a compound of bismuth.

9. The polyisocyanurate foam insulation product of claim 1, wherein one of the polyols has a functionality of more than 2.30 and a hydroxyl number of more than 275, and the other polyol has a functionality of less than 2.20 and a hydroxyl number of less than 250.

10. The polyisocyanurate foam insulation product of claim 1, wherein the the first polyol and the second polyol have the same functionality.

11. The polyisocyanurate foam insulation product of claim 1, wherein the fire retardant is non-halogenated.

12. The polyisocyanurate foam insulation product of claim 11, wherein the fire retardant comprises diethyl hydroxymethyl phosphonate (DEHMP).

13. The polyisocyanurate foam insulation product of claim 1, wherein the fire retardant comprises one or more compounds selected from the group of compounds consisting of an organo-phosphate, an organo-phosphite, and an organo-phosphonate.

14. The polyisocyanurate foam insulation product of claim 1, wherein the fire retardant comprises tris(2-chloroisopropyl)phosphate (TCPP).

15. The polyisocyanurate foam insulation product of claim 1, wherein the polyisocyanurate foam insulation product is a rigid foam having a density of less than 2.0 lbs/ft$^3$.

16. The polyisocyanurate foam insulation product of claim 1, wherein the polyisocyanurate foam insulation product is a rigid foam having a density of less than 1.7 lbs/ft$^3$.

17. The polyisocyanurate foam insulation product of claim 1, wherein the polyisocyanurate foam insulation product is a rigid foam having a density of less than 1.61 lbs/ft$^3$.

18. The polyisocyanurate foam insulation product of claim 1, wherein the polyisocyanurate foam insulation product is a closed cell foam having a cell size of 120 μm or less.

19. The polyisocyanurate foam insulation product of claim 1, wherein the polyol-containing component comprises two polyester polyols.

20. The polyisocyanurate foam insulation product of claim 1, wherein the polyol-containing component comprises two polycarbonate polyols.

21. The polyisocyanurate foam insulation product of claim 1, wherein the polyol-containing component comprises:
   between 0.1 and 1.0 weight percent of a compound containing zinc and an organic complex; and
   diethyl hydroxymethyl phosphonate (DEHMP);
   wherein the first polyol has a functionality of more than 2.30 and a hydroxyl number of more than 275, and the second polyol hays a functionality of less than 2.20 and a hydroxyl number of less than 250.

22. The polyisocyanurate foam insulation product of claim 21, wherein the compound comprises a zinc carboxylate.

23. The polyisocyanurate foam insulation product of claim 1, wherein the blowing agent comprises a 50/50 mixture of n-pentane and isopentane.

24. The polyisocyanurate foam insulation product of claim 1, wherein the blowing agent comprises one or more fluorocarbon gases selected from the group of fluorocarbon gases consisting of HFC-245fa (1,1,1,3,3-pentafluoropropane), HFC-365mfc ($CF_3CH_2CF_2CH_3$), HFC-134a (1,1,1,2-tetrafluoroethane), HCFO 1233zd (trans-1-chloro-3,3,3-trifluoropropene), and HFO-1336mzz (1,1,1,4,4,4-hexafluoro-2-butene).

25. The polyisocyanurate foam insulation product of claim 1, further comprising water, wherein the water reacts with isocyanate in the isocyanate component to form carbon dioxide, the carbon dioxide acting as a blowing agent.

26. An insulated structure comprising:
   a plurality of structural support members coupled together to form a frame; and
   a plurality of polyisocyanurate foam insulation boards attached to an exterior side of the frame to form an insulation layer, wherein each of the polysiocyanurate foam insulation boards comprises a polyisocyanurate core produced from an isocyanate component, and a polyol-containing component including a blowing agent;
   wherein the polyol-containing component comprises a first polyol and a second polyol, a fire retardant, and one or more surfactants, wherein the first polyol and the second polyol have different hydroxyl numbers, or have different functionalities, or differ in both hydroxyl number and functionality;
   and wherein the polyisocyanurate foam insulation product has an R-value per inch of at least 5.7 when measured at 40° F.

27. A roof system comprising:
   a structural deck positioned atop joists or other support members of the roof system;
   a plurality of polyisocyanurate foam insulation boards positioned atop the structural deck to form an insulation layer for the roof system; and
   a waterproof membrane positioned atop the plurality of polyisocyanurate foam insulation boards to form a waterproof layer for the roof system;
   wherein each polyisocyanurate foam insulation board includes a polyisocyanurate core produced from an isocyanate component and a polyol-containing component including a blowing agent;
   wherein the polyol-containing component comprises a first polyol and a second polyol, a fire retardant, and one or more surfactants, wherein the first polyol and the second polyol have different hydroxyl numbers, or have different functionalities, or differ in both hydroxyl number and functionality;
   and wherein the polyisocyanurate foam insulation product has an R-value per inch of at least 5.7 when measured at 40° F.

28. The polyisocyanurate foam insulation product of claim 1, wherein:
   the first polyol and the second polyol total about 64-90 weight percent of the polyol-containing component;
   the fire retardant is present in an amount of 5-15 weight percent of the polyol-containing component;
   the one or more surfactants are present in an amount totaling 0.5-4.0 weight percent of the polyol-containing component; and
   the polyol-containing component comprises a metallo-organic compound in an amount of 0.1 to 10 weight percent of the polyol-containing component.

* * * * *